Figure 6:
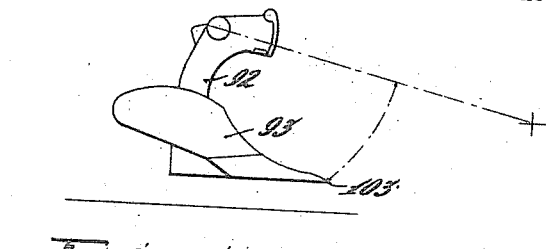

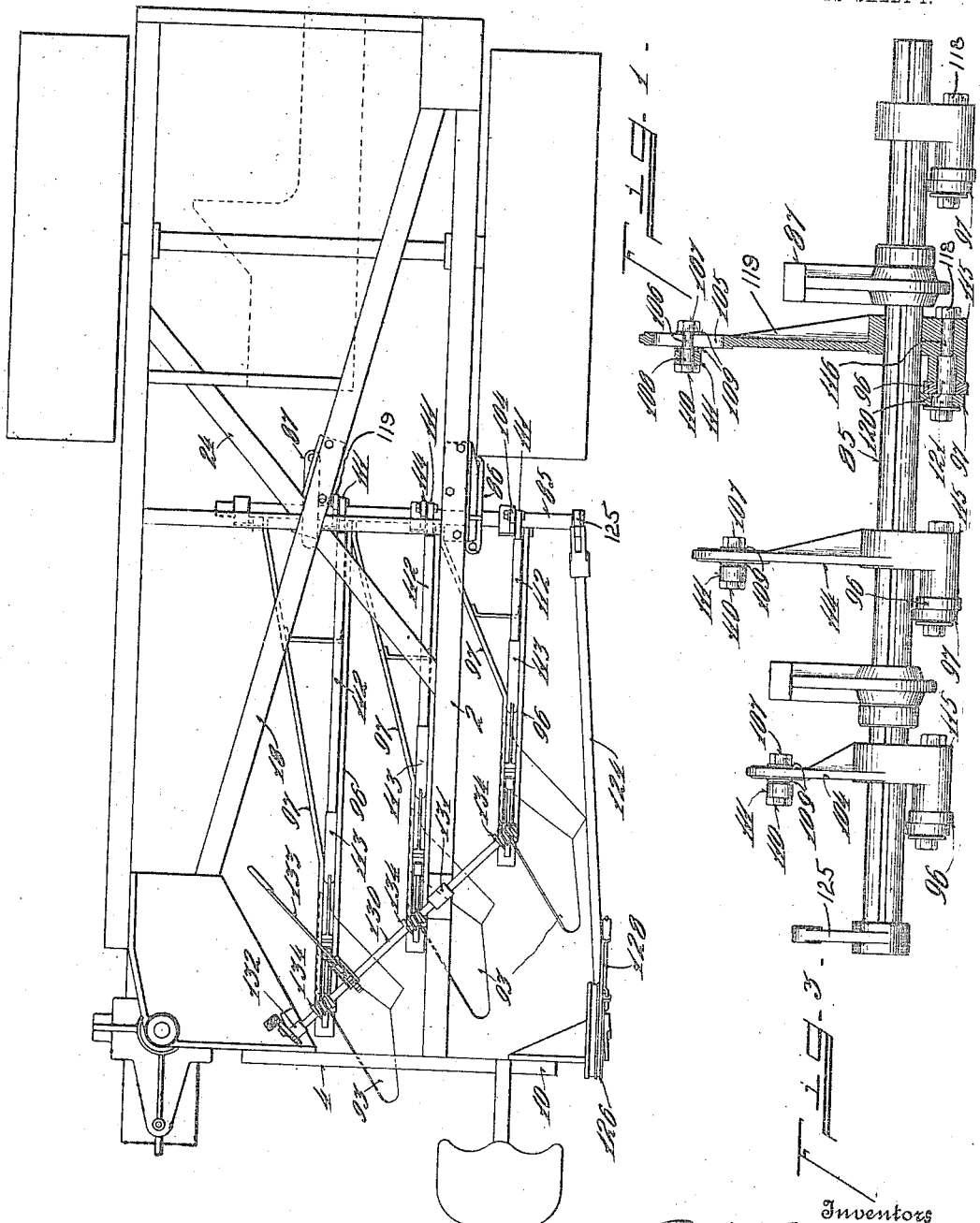

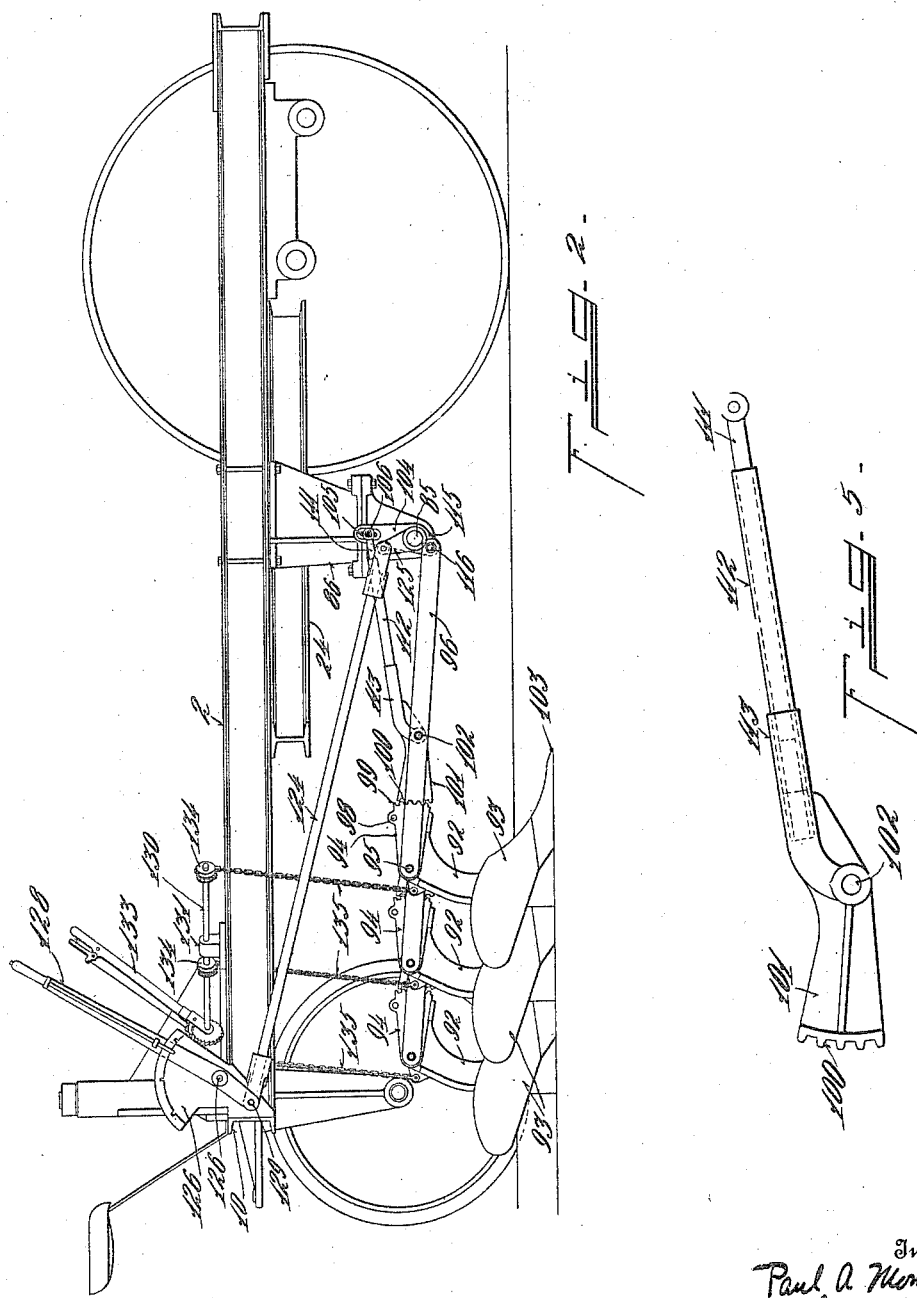

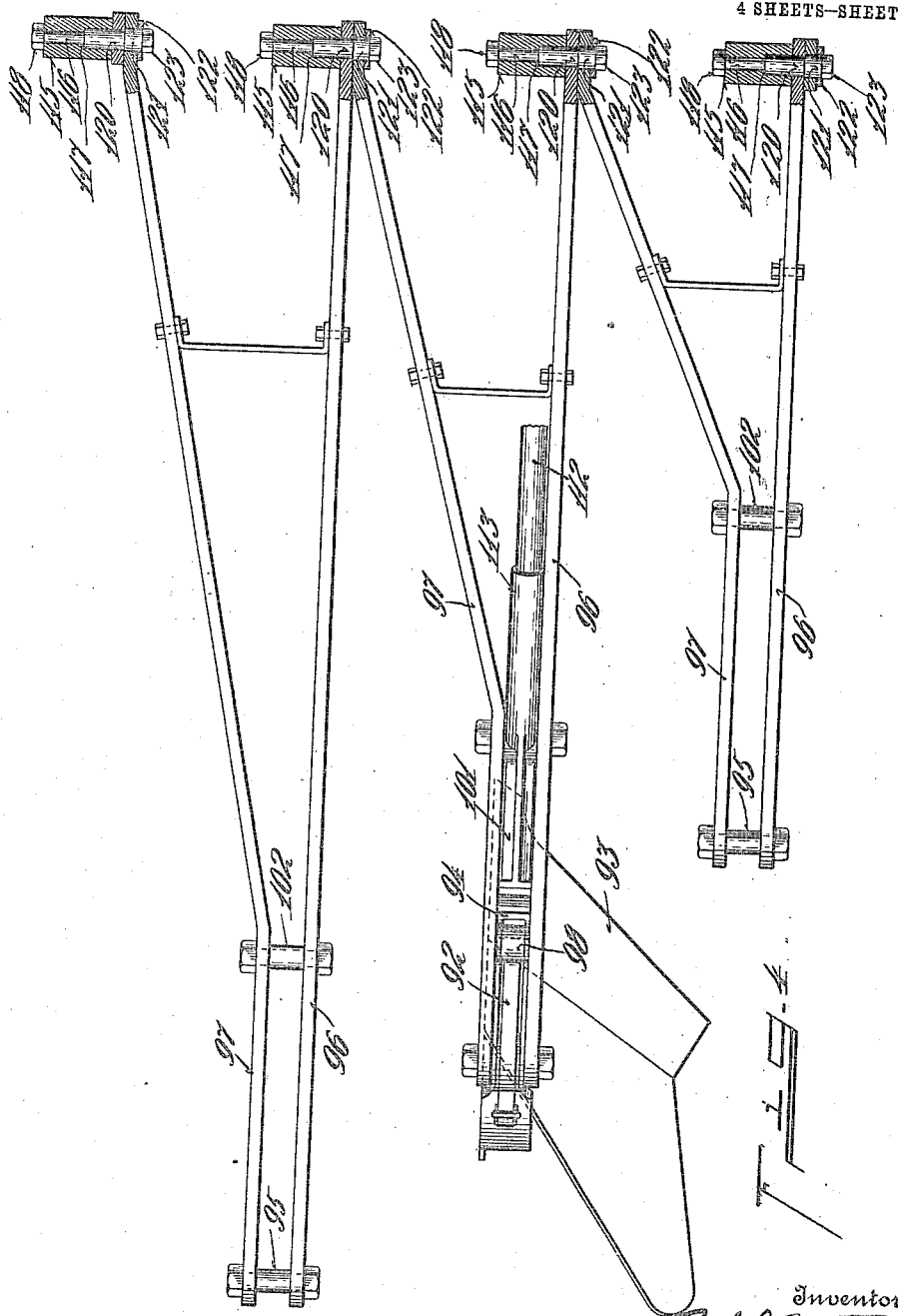

P. A. MONTANUS & A. W. GRANT.
PLOW.
APPLICATION FILED MAR. 23, 1912.

1,051,346.

Patented Jan. 21, 1913.
4 SHEETS—SHEET 4.

Witnesses
Oliver B. Keiser
C. B. Foster

Inventors
Paul A. Montanus
Arthur W. Grant
By Wood, Wood & Nathan
Attorney

UNITED STATES PATENT OFFICE.

PAUL A. MONTANUS AND ARTHUR W. GRANT, OF SPRINGFIELD, OHIO, ASSIGNORS TO GRAMONT TRACTION PLOW COMPANY, OF SPRINGFIELD, OHIO, A COPARTNERSHIP.

PLOW.

1,051,346.  Specification of Letters Patent.  Patented Jan. 21, 1913.

Application filed March 23, 1912. Serial No. 685,867.

*To all whom it may concern:*

Be it known that we, PAUL A. MONTANUS and ARTHUR W. GRANT, citizens of the United States, residing at Springfield, in the county of Clark and State of Ohio, have invented certain new and useful Improvements in Plows, of which the following is a specification.

This invention relates to constructions in plows and deals more especially with certain improvements better adapting either one or a plurality of plows to be drawn from a wheeled frame, as of a motor-propelled type and to be manipulated with facility by an operator seated on said frame.

One object within the contemplation of this invention is to provide a simple, inexpensive and durable construction of such a character that an operator seated on a wheeled frame may be able to cause one or more plows to turn furrows of any desired depths by the actuation of easily operating control instrumentalities.

Another object is to render available a plow structure embodying certain adjustments whereby it may be caused automatically to maintain its plowing toe at any predetermined depth without requiring the use of rigid non-swinging connections with the frame.

A further object is to provide a connection between the plow and its draw beam capable of an angular adjustment, and to arrange means on such draw beam in such coöperative relationship with manipulative instrumentalities on the frame that the operator may be able from his seat to vary such adjustment while the apparatus is in operation.

Another object is to attach a plow to a frame by means of connections such that if the plow rises toward the frame, its angle relative to such connections will increase so as to depress its toe and cause the plow to seek a lower level in the ground (and conversely) thereby enabling it to automatically maintain a predetermined level.

Another object is to provide means for varying the angle between the plow and its draw beam together with means for simultaneously throwing the plow slightly to the rear when such angle is diminished so as to enable the operations to take place with less resistance.

Another object is to devise a simple and effective means for connecting a plurality of plows to a frame whereby the spacing between the plows or their upstanding positions may be easily and accurately adjusted and whereby their positions may be varied.

Another object is to formulate an arrangement whereby a plurality of plows in echelon arrangement may be simultaneously and equally adjustable from a drag bar arranged transversely so as to be differently distanced from the several plows.

Other objects and advantages will be in part indicated in the following description and in part rendered apparent in connection with the annexed drawings.

To enable others skilled in the art to so fully apprehend the underlying features hereof that they may embody the same in the various ways contemplated by this invention, drawings depicting the preferred construction have been annexed as a part of this disclosure, and in such drawings, like characters of reference denote corresponding parts throughout all the views, of which:—

Figure 7:
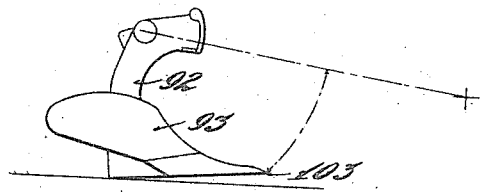
Figure 8:
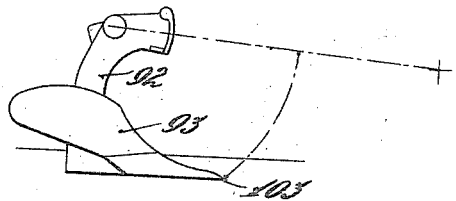
Figure 9:
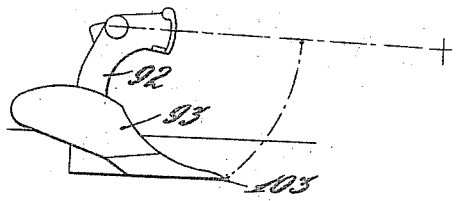

Figure 1 is a top plan view showing the manner in which it is preferred to relate the plow units to a frame. Fig. 2 is a side elevation, showing in assembly the elements of one of the plows and indicating the general construction which may be followed in each of a plurality of plows. Fig. 3 is an elevation of the draw bar as seen looking rearwardly from the front showing elements thereon for connecting the plows with the frame, and showing in section one of the adjusting levers of the draw bar. Fig. 4 is a partial assembly of the plow beams showing the manner of mounting the same on the draw bar levers. Fig. 5 is a detail of one of the plow adjusting segments showing the mounting of the telescoping parts. Fig. 6 graphically shows a plow embodying this invention as suspended clear of the ground by a hoisting chain. Fig. 7 graphically shows such a plow trailing on the surface of the ground due to an elevation of its toe. Fig. 8 graphically shows the plow operating at a depth conforming to the angle between the plow and beam. Fig. 9 graphically shows the plow operating deeper due to an increase in such angle.

This invention proposes a plow organization such that although it may be carried upon a wheeled frame, such as that disclosed and claimed in our copending application filed March 23, 1912, No. 685,868, it will nevertheless provide or permit of the greatest control and facility of operation by the operator. In other words, it is sought to provide a machine plow which will be comparable with a hand plow in respect to its manipulative capacity, and which in addition will, by the use of a plurality of plows and by reason of the great traction power available and the superior application thereof, perform a great amount of work and require the services of a single attendant with a minimum of labor. The plowing instrumentalities may be advantageously connected with a draw bar 85 located rearward of the axle of the propelling wheels and preferably near the center of a frame directly underlying the crossing of the diagonals 18 and 24 so as to utilize the point of maximum strength of the frame for carrying the load of the plows. This draw bar is preferably positioned near the ground so that the pull on the plows may be as direct as possible so as to avoid undue bending strains in the parts, and to that end, brackets 86 and 87 may be bolted to and depend from the side beam 2 and the diagonal 18 respectively.

This invention seeks to provide a plow construction having certain adjustments such that the plows may freely and automatically operate at any predetermined depth without involving any strains or applications of force other than are utilized in the regular pulling of such plows. To that end, the arm or standard 92 of the plow 93 has its upper portion arranged between the sides of the U-shaped segment 94 Fig. 4 and the pin 95 serves to pivot these parts to the plow beams 96 and 97. This standard 92 is fixed against rotation with respect to the segment 94 by means of the safety shear-pin 98 so constructed that, in case any unduly abrupt load or shock is brought on the plow, such pin will shear and prevent damage to other parts. At one end the segment 94 is provided with gear teeth 99, which mesh with corresponding teeth 100, on the segment 101, which is pivoted to the plow beams by the pivot bolt 102. This mechanism is connected to the draw bar in such a manner that the angle between the toe 103 of the plow and the draw beam 96 may be varied, even when the plow is being drawn through the ground and without involving undue strength on the part of the operator. The effect of this has been found to vary the depth of the plow in the ground, as will be fully explained subsequently, i. e., should the plow be swung anticlockwise about the pivot 95, then it will seek a higher level in the ground until it reaches the position of stability conforming to its new angle, and if this angle be sufficiently great, the plow, of course, will rise to the surface of the ground and will trail thereover without doing any work. The mechanism for enabling this angular adjustment to be effected with ease and certainty may now be described.

Fixed to and spaced along the draw bar 85 is a series of levers 104, 114, and 119. Each lever has a short arm 115, extending below the draw bar 85 and provided with an aperture for the pin 116, whereby it is pivoted to the plow beams 96·97. The purpose of pivoting these beams 96 and 97 to this lever, instead of directly to the draw bar 85, is to cause them to be moved back slightly and allow a corresponding retreat of the plow whenever the angle of the latter is to be so adjusted as to cause the plow to seek a higher level or emerge from the ground, as the case may be. It has been found that this peculiar connection greatly facilitates this operation and materially reduces the labor required for the manipulation of the levers. The upper arm of each of the levers 104, 114 and 119 is provided with a slot 105, adapted to enable the pivot bolt 106 to be fixed in various adjusted positions. This bolt may be constructed in the manner shown more clearly by Fig. 3, and may consist of the head 107, the journal portion 108, the clamping washers 109, and the clamping nut 110, all as will readily be understood. To this pivot pin is journaled the end of the rod 111 which slidably telescopes within the tube 112 which is in turn secured in the socket 113 of the segment 101. By turning the levers 104, 114 and 119 to the right, Fig. 2, the rod 111 will slide and be somewhat withdrawn from its telescoping tube 112 and the latter will swing toward the beam 96. This will, through the segments 94 and 101, move the plow in a contrary direction, but also upwardly toward the beam 96 and simultaneously the beam 96 will be thrown slightly to the rear by the pivot 116.

Reference should here be made to Fig. 4, which shows the draw beam 96 made straight and the draw beam 97 bent out or spread away from its companion, beginning at a point near the pivot 102. This provides the desirable wide base insuring steadiness against any side play of the plows. The forward end of the beam 97 is mounted in a somewhat analogous manner to that just described in connection with the beam 96, but certain refinements may be noted whereby a single pivot pin may be used for supporting both the bent beam of one plow and the straight beam of the adjacent plow, and at the same time permit of adjustments in the positions of said plows with reference to said frame.

Referring now to Fig. 3, 114 is a second lever which is keyed to the draw bar 85 at a distance from the first mentioned lever conforming to that between the ends of the draw beams 96, 97. The plows are arranged in echelon and the upper arm of this lever is longer than that of the first mentioned lever 104, in proportion to the increased distance between the second plow and the draw bar, so that a similar angular movement of said draw bar will produce equal angular movements in all the plows. In like manner the third draw-bar lever has a still longer upper arm. The lower arms however are of an equal length in the several actuating levers, so that a similar and identical retreat of the plows will take place simultaneously. Turning again to Fig. 4, 115 indicates the lower ends of the several lever arms each of which is apertured to receive the pin 116, said aperture being shouldered at 117, to enable such pin to be drawn tightly into position by the nut 118 without clamping either the bent plow beam 97 or the straight plow beam 96 of the companion plow. This straight draw beam of the second plow is journaled on the concentric portion 120 of the bolt, but the bent draw beam 97 of the first plow is journaled on an eccentric portion 121 and is retained against outward movement by the washer 122 and the nut 123. By reason of this construction, it will be seen that the center of the pivot of the bent beam may be varied in position so that the corresponding plow may be given any desired lateral position with relation to its companions. This construction is followed in the several connections of the bent and straight draw beams, and the right-hand side straight draw beam 96 may be secured by an ordinary pin to its arm, or the same pins may be used throughout and at the sides, where but a single draw-beam connects with the lever, the absent member may be replaced by a washer of similar thickness.

Being connected to the frame at its forward end only by pivots, the plow-beam is a floating element free to rise and sink at its rear end according to the action of the plow in the ground. Being free to seek its own level, the plow will dig deeper if its toe pitches downwardly, or conversely, until it assumes a direction of equilibrium which, for purposes of explanation, may be assumed to be on a level. The depth in the ground will therefore depend upon the angle between the plow and the draw beam, so that the depth will be greater or less with a corresponding variation in such angle. The angle being fixed, a definite depth will be approximated. This action is sensitized by the system of levers and links determining such angle, for, should the plow rise, the system will operate to deepen the pitch beyond that which would be produced with a fixed angle; this accentuated effect being incidental to an increase in the angle between the plow and the beam through the operation of the system. Consequently, this apparatus embodies what may be regarded as a "floating" plow which is sensitively automatic in closely maintaining a predetermined depth. By moving the control lever at the seat, the driver may readily determine the initial angle, and thus, with the greatest of facility, cause the plows to turn a furrow of any desired depth. The ease of this manipulation is further enhanced by the fact that the draw beam is connected to the frame through the depending arm of the lever, for its pull tends to turn such lever in the direction which it would be moved by the operator in causing a shallowing of the cut. In other words, the plow beam is pivoted at its front end to a rock arm whereby the pivotal point has a movement in the arc of a circle thrusting the beam forwardly or rearwardly in the vertical plane. The plow and its support are in turn pivoted to the rear end of the beam, and mechanism connects said support to a second rock arm, so that when the rocking mechanism is operated the beam and support are simultaneously rocked within the vertical plane to adjust the plow point. When the rock shaft operating lever is set, the beam is still free to rock on its fixed pivot, which movement will also adjust the relationship of the plow support with respect to the beam. The movement of the beam and the member for rocking the support on the beam is in this embodiment substantially scissor-like in character when the rock shaft is actuated, or when the beam rocks on its pivot while the latter is locked in its fixed position. The rocking mechanism may be operated to point the plow downwardly or upwardly for embedding the plow in the earth or withdrawing it so that the depth of furrow can be controlled. The function of the mechanism when the beam pivot is fixed, is to enable an automatic adjustment of the embedded plow to a furrow opening plane.

The hand operated means for rotating the draw bar 85 may be constructed in any suitable manner. As shown, this may consist of an elongated rod 124 connected with the end of the crank arm 125 which is carried by and uprises from the draw-bar 85. This rod extends rearwardly to the vicinity of the operator's seat which is on the right-hand overhanging corner of the frame, and adjacent which is located a suitable segment 126. This segment may be bolted to the extending portion 10 of the rear frame beam 4. Pivoted at 127 to the segment is the hand-lever 128 having an arm-portion extending from said pivot 127 to a connection 129 with the operating rod 124.

It is to be noted that the aforesaid elements are arranged and connected in such a manner that the rod 124 acts as a compression member in turning the draw-bar clockwise. This movement, however, will not call for an application of sufficient force to cause such rod 124 to buckle, for such movement is attained by a retreat of the plowing toe if the machine is standing still, and if it is advancing, the pull c the plow-beams will operate to turn such draw-bar 85 in the same direction. On the other hand, when it is desired to turn the draw-bar 85 anti-clockwise, the rod 124 acts as a tension member and will readily transmit such force as may be required since it then has no tendency to buckle.

When the machine is traveling to or from its work, it is desirable to lift the plows clear from the ground, and this may be done by means of the turn-shaft 130 which is arranged at such an angle as will locate it on the frame above the plows. It may be supported by bearings 131 and 132, and may be turned by the ratchet lever 133. This turn-shaft carries worms 134, one being above each plow, and chains 135 extend from each plow to the overlying worm, so that upon turning the shaft, they will be wound up on such worms and lift the plows clear of the ground.

Having described our invention, we claim:—

1. A structure of the nature disclosed combining a frame, a plow body, a draw beam pivoted thereto and extending into connection with said frame, determining means automatically varying the angle between the draw beam and the plow body in accordance with the movement in a vertical plane of the draw beam, and mechanism operable from the frame for adjustably controlling said determining means and ineffective to impede the free vertical swing of said draw beam.

2. A structure of the nature disclosed combining a frame, a plow body, a draw beam pivoted to said plow body and having an adjustable mounting on said frame, and means automatically positively determining the angle between said plow body and said draw beam in accordance with the adjustment of the mounting of said draw beam on said frame.

3. A structure of the nature disclosed combining a frame, a bracket depending from an intermediate portion of said frame, a draw beam pivoted to said bracket and extending rearwardly beneath said frame, a plow body pivoted to the rear end of said draw beam, means for adjusting the pivotal relationship between the draw beam and said bracket, and mechanism extending from said means to said plow body for adjusting the angular relation in a vertical plane between said plow body and said draw beam.

4. A structure of the nature disclosed, combining a plow body, a draw beam pivoted thereto, a frame, adjustable connections between said beam and frame, and means for simultaneously adjusting said connections and varying the angle between the plow body and said beam.

5. A structure of the nature disclosed, combining a plow body, a draw beam pivoted thereto, a frame, connections between said draw beam and frame, and means for decreasing the angle between said plow body and said beam and simultaneously adjusting said connections to move said draw beam rearwardly.

6. A structure of the nature disclosed, combining a plow body, a draw beam pivoted thereto, a frame connected with said beam, and instrumentalities extending from said frame to the pivoted connections of said plow body for so adjusting the angle of the same relative to said draw beam as automatically to vary the angle of the plow body relative to the ground.

7. A structure of the nature disclosed, combining a plow body, a draw beam pivoted thereto, a frame, means connecting said draw beam with said frame, and mechanism extending from the plow body to the forward end of said beam and operative to adjust the angular relation between said plow body and said beam progressively to increase the angle between the ground and the plow body in accordance with the relative uprise of the latter.

8. A structure of the nature disclosed, combining a plow body, a draw beam extending therefrom, a frame, a lever pivotally connected with said draw beam and with said frame, said pivots being vertically distanced from one another, a lever operating means to vary the position of the draw beam relative to said frame and mechanism connected with said means for determining the angle between said plow body and said draw beam.

9. A structure of the nature disclosed, combining a plow body, a draw beam pivoted thereto, instrumentalities for adjusting the angular relation between said parts, a frame, a lever connected with said instrumentalities and also connecting said draw beam with said frame and adjustable to vary the relation between said draw beam and frame.

10. A structure of the nature disclosed, combining a plow body, a draw beam pivoted thereto, a frame, a lever pivoted at an intermediate point to said frame and at its lower end connected with said beam, and means for connecting the upper end of said lever with the plow body for varying the angle between the plow body and said beam by turning said lever.

11. A structure of the nature disclosed, combining a plow body, a draw beam pivoted thereto, a frame, a lever connected between said draw beam and frame, and means connecting said plow body with said lever, the connections being so arranged that when said lever is moved to decrease the angle between said plow body and said beam, said draw beam will be moved rearwardly.

12. A gang plow structure of the nature disclosed, combining a plurality of plows arranged in echelon, a frame, and a plurality of progressively longer draw beams each extending from one of said plows and all connected to said frame at points approximately in transverse alinement, and means operative from the frame for simultaneously varying the angle between each of the plows and its draw beam.

13. A gang plow structure of the nature disclosed, combining a plurality of plows arranged in echelon, a frame, and a plurality of progressively longer draw beams each extending from one of said plows and all connected to said frame at points approximately in transverse alinement, and means operative from the frame for simultaneously and equally varying the angle between each of the plows and its draw beam.

14. A plow structure of the nature disclosed combining a frame, a member having a fixed pivotal mounting thereon, a draw beam pivoted to said member at a point distant from its fixed pivot, a plow pivoted to said draw beam, and means connecting said plow and member for swinging said member about its fixed pivot and simultaneously adjusting the angular relation between said plow and draw beam.

15. A plow structure of the nature disclosed combining a frame, a vertically floating plow, means dragging said plow from said frame, mechanism automatically positively determining the pitch of said plow in accordance with the vertical rise and fall of said plow relative to said frame, and means for adjusting said mechanism.

16. In a device of the nature disclosed, a frame, a rock shaft having two arms, a plow beam pivoted to one of said arms, a plow and plow support pivotally connected to said beam, connections between said second arm and said support for rocking the latter in a vertical plane when the beam is moved in said plane, and means for operating the rock shaft.

17. In a device of the nature disclosed, a frame, a rock shaft having two arms, a plow beam pivoted to one of said arms, a plow and plow support pivoted on said beam, and means connecting said support with said second arm adapted to rock said support when said beam is operated, and means for operating said rock shaft to simultaneously move the beam and rock the support thereon.

18. In a device of the nature disclosed, a frame, a plow beam pivotally suspended at its front end from the frame, a plow and plow support pivotally secured on the rear end of said beam, and means for simultaneously adjusting the pivotal end of the beam and the angular adjustment of said support in a vertical plane.

19. In a device of the nature disclosed, a frame, a rock shaft having two arms, a plow beam pivotally connected at the front end to one of said arms, a plow and plow support pivotally secured to the rear end of said beam, a toothed segment on said support, a member pivoted intermediately on the beam, the front end of said member having a sliding connection with said second rock arm, the rear end of said member having a toothed segment engaging with the segment of the support, and means for operating said rock shaft, whereby the pivotal point of the beam is moved and the angular adjustment of the support is simultaneously varied in the vertical plane when the rock shaft is operated.

20. In a device of the nature disclosed, a frame, a rock shaft having two arms, a plow beam pivotally connected at the front end to one of said arms, a plow and plow support pivotally secured to the rear end of said beam, a longitudinally extensible member intermediately pivoted to the beam, its opposite ends being connected to said second arm and to said support, and means for operating the rock shaft, whereby the pivotal point of the beam and the angular adjustment of the plow are simultaneously changed in the vertical plane when said shaft is operated, said longitudinally extensible provision enabling the angular adjustment of the support to be automatically varied under the influence of the draft when the plow is embedded in the earth.

21. In a device of the nature disclosed, a frame, a plow beam pivotally suspended at its front end, means for vertically adjusting said pivotal point, a plow and plow support angularly adjustable in a vertical plane on the rear end of said beam, means for simultaneously effecting the adjustments of said beam and support, and means enabling the support to be independently adjusted relative to the beam under the influence of the draft when the plow is embedded in the earth.

22. In a device of the nature disclosed, a frame, a series of plow beams pivotally suspended at their front ends from the frame, a plow and plow support pivotally secured at the rear end of each beam, means for simultaneously adjusting pivotal ends of the beams and the angular adjustment of said supports in vertical plane, and means at the pivotal ends of said beams for adjusting said beams at different angles in a horizontal plane for lateral spacing of the plows.

23. In a device of the nature disclosed, a frame, a rocking mechanism, a plow beam and plow support, and connections between said rocking mechanism and said beam and support adapted to impart a scissors-like movement to the beam and support for adjusting the plow in a vertical plane.

24. In a device of the nature disclosed, a frame, a rocking mechanism, a plow beam and plow support, connections between said rocking mechanism, and said support and beam adapted to impart a scissors-like movement to the beam and support for adjusting the plow in a vertical plane, said connections enabling an independent movement of the support relative to the beam under influence of the draft when the plow is embedded in the earth enabling the plow to travel in a furrow opening plane.

25. In a device of the nature disclosed, a frame, a plow beam pivotally supported at its front end, a plow and plow support pivotally supported at the rear end of the beam, and means connecting said support relative to the frame, adapted to rock said support on the beam when the beam is rocked on its pivot.

26. In a device of the nature disclosed, a frame, a plow beam pivotally supported at its front end, a plow and plow support pivotally supported at the rear end of the beam, means connecting said support relative to the frame, adapted to rock said support on the beam when the beam is rocked on its pivot, and means for vertically adjusting the beam pivot adapted to simultaneously move the beam and support to adjust the plow point.

27. In a device of the nature disclosed, a frame, a plow and plow suspending means, means on the frame for adjusting the plow to point upwardly or downwardly, and means actuated by the draft when it is embedded in the earth to automatically adjust the plow point in a substantially horizontal alinement enabling the plow to travel in a furrow opening plane.

28. In a device of the nature disclosed, a frame, a plow beam pivoted at its front end, means for rocking said pivot point in a vertical plane, a plow and support pivoted at the rear end of said beam and adapted to be rocked in a vertical plane, and means for simultaneously effecting said rocking movements to adjust the plow angle.

29. In a device of the nature disclosed, a frame, a pivotally mounted plow beam, a plow and plow support angularly adjustable on the beam, means controllable by an operator on the frame for simultaneously rocking the beam and the support thereon and devices for locking the controlling mechanism in any predetermined position.

30. In a device of the nature disclosed, a frame, a pivotally mounted plow beam, a plow and plow support pivotally mounted on said beam, means controllable by the operator on the frame for operating the beam, devices for locking the operating mechanism in any predetermined position, and means operatively connecting said beam and the support to produce relative movement between them when the beam is operated, said connecting means being adapted to enable an automatic adjustment of the plow when the beam operating mechanism is in set position.

31. In a device of the nature disclosed, a frame, a pivotally mounted beam, a plow and plow support pivotally mounted on the beam, means for rocking the pivoted point of the beam in the arc of a circle in vertical plane, and means connecting the beam and the plow support, adapted to simultaneously rock the plow support in the arc of a circle in a vertical plane, thereby producing relative movement between the beam and support for adjusting the plow when the pivotal point of the beam is moving into its arc of travel, said means enabling a relative movement of the beam and support when the beam pivotal point is fixed in a given position of adjustment, for automatically bringing the plow into a furrow opening plane.

In testimony whereof, we have hereunto set our hands.

PAUL A. MONTANUS.
ARTHUR W. GRANT.

Witnesses:
EDWARD SIDNEY MONTANUS,
MARY CATHERINE DEASY.

Copies of this patent may be obtained for five cents each, by addressing the "Commissioner of Patents, Washington, D. C."